(12) United States Patent
Klingenbrunn et al.

(10) Patent No.: US 9,237,485 B2
(45) Date of Patent: Jan. 12, 2016

(54) DEFERRED MEASUREMENT CONTROL READING OF SYSTEM INFORMATION BLOCK (SIB) MESSAGES

(71) Applicant: QUALCOMM Incorporated, San Diego, CA (US)

(72) Inventors: Thomas Klingenbrunn, San Diego, CA (US); Yongsheng Shi, San Diego, CA (US); Francesco Pica, San Diego, CA (US); Bhupesh Manoharlal Umatt, San Diego, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 314 days.

(21) Appl. No.: 13/673,761

(22) Filed: Nov. 9, 2012

(65) Prior Publication Data
US 2013/0128863 A1    May 23, 2013

Related U.S. Application Data

(60) Provisional application No. 61/561,741, filed on Nov. 18, 2011.

(51) Int. Cl.
*H04W 36/14* (2009.01)
*H04W 36/00* (2009.01)
*H04W 48/08* (2009.01)
*H04W 48/12* (2009.01)

(52) U.S. Cl.
CPC .......... *H04W 36/0022* (2013.01); *H04W 36/14* (2013.01); *H04W 48/08* (2013.01); *H04W 48/12* (2013.01)

(58) Field of Classification Search
None
See application file for complete search history.

(56) References Cited

U.S. PATENT DOCUMENTS

| | | | |
|---|---|---|---|
| 8,861,433 B2 * | 10/2014 | Burbidge et al. | 370/328 |
| 8,873,407 B2 * | 10/2014 | Burbidge et al. | 370/252 |
| 2006/0276190 A1 * | 12/2006 | Shaheen | 455/436 |
| 2008/0285494 A1 | 11/2008 | Shin | |
| 2008/0287127 A1 * | 11/2008 | Wu et al. | 455/434 |
| 2009/0034452 A1 * | 2/2009 | Somasundaram et al. | 370/328 |
| 2009/0316603 A1 | 12/2009 | Amerga et al. | |
| 2010/0279679 A1 | 11/2010 | Young et al. | |
| 2010/0290437 A1 * | 11/2010 | Wang et al. | 370/335 |

(Continued)

FOREIGN PATENT DOCUMENTS

WO    2011100707 A1    8/2011
WO    2011125697 A1    10/2011

OTHER PUBLICATIONS

Ericsson et al., "Improved Deferred Measurement Control Reading", 3GPP DRAFT; R2-115203 Imporved DMCR Handling V3, 3rd Generation Partnership Project (3GPP), Mobile competence Centre; 650, Route DES Lucioles; F-06921 Sophia-Antipolis CEdex; France, vol. RAN WG2, no. Zhuhai; Oct. 10, 2011, Oct. 2, 2011, XP050540699.

(Continued)

*Primary Examiner* — Mounir Moutaouakil
(74) *Attorney, Agent, or Firm* — Seyfarth Shaw LLP

(57) ABSTRACT

A method of wireless communication defers measurement control reading of a SIB. The method includes determining whether a user equipment (UE) has been redirected to a first radio access technology (RAT) from a second RAT. The method also includes selectively reading a system information block (SIB) based on whether the UE was redirected to the first RAT from a second RAT.

12 Claims, 8 Drawing Sheets

(56) References Cited

U.S. PATENT DOCUMENTS

| | | | |
|---|---|---|---|
| 2010/0296421 A1* | 11/2010 | Watfa et al. | 370/310 |
| 2011/0105119 A1* | 5/2011 | Bienas et al. | 455/436 |
| 2011/0171926 A1* | 7/2011 | Faccin et al. | 455/404.1 |
| 2011/0199950 A1 | 8/2011 | Klingenbrunn et al. | |
| 2011/0201279 A1 | 8/2011 | Suzuki et al. | |
| 2012/0015646 A1* | 1/2012 | Burbidge et al. | 455/422.1 |
| 2012/0100853 A1* | 4/2012 | Xiong et al. | 455/436 |
| 2013/0028199 A1* | 1/2013 | Song et al. | 370/329 |
| 2013/0059579 A1 | 3/2013 | Uno et al. | |
| 2013/0059586 A1* | 3/2013 | Hao et al. | 455/436 |
| 2013/0079012 A1* | 3/2013 | Kubota et al. | 455/437 |
| 2013/0165120 A1* | 6/2013 | Nylander et al. | 455/436 |
| 2013/0210422 A1* | 8/2013 | Pani et al. | 455/423 |
| 2014/0177596 A1* | 6/2014 | Watfa et al. | 370/331 |

OTHER PUBLICATIONS

International Search Report and Written Opinion—PCT/US2012/064686—ISA/EPO—Feb. 8, 2013.

* cited by examiner

DEFERRED MEASUREMENT CONTROL READING OF SYSTEM INFORMATION BLOCK (SIB) MESSAGES

CROSS-REFERENCE TO RELATED APPLICATION

This application claims the benefit under 35 U.S.C. §119(e) to U.S. Provisional Patent Application No. 61/561,741 entitled "DEFERRED MEASUREMENT CONTROL READING OF SYSTEM INFORMATION BLOCK (SIB) MESSAGES," filed on Nov. 18, 2011, the disclosure of which is expressly incorporated by reference herein in its entirety.

BACKGROUND

1. Field

Aspects of the present disclosure relate generally to wireless communication systems, and more particularly to deferring measurement control reading of a system information block (SIB).

2. Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency divisional multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example of an emerging telecommunication standard is Long Term Evolution (LTE). LTE is a set of enhancements to the Universal Mobile Telecommunications System (UMTS) mobile standard promulgated by Third Generation Partnership Project (3GPP). It is designed to better support mobile broadband Internet access by improving spectral efficiency, lower costs, improve services, make use of new spectrum, and better integrate with other open standards using OFDMA on the downlink (DL), SC-FDMA on the uplink (UL), and multiple-input multiple-output (MIMO) antenna technology. However, as the demand for mobile broadband access continues to increase, there exists a need for further improvements in LTE technology. Preferably, these improvements should be applicable to other multi-access technologies and the telecommunication standards that employ these technologies.

SUMMARY

In one aspect, a method of wireless communication is disclosed. The method includes determining whether a UE has been redirected to a first radio access technology (RAT) from a second RAT. The method also includes selectively reading a system information block (SIB) based, at least in part, on whether the UE has been redirected from a RAT to the first RAT or as a result of a normal connection request to the first RAT.

Another aspect discloses wireless communication having a memory and at least one processor coupled to the memory. The processor(s) is configured to send a radio resource control (RRC) connection request according to a first radio access technology (RAT). The processor(s) is also configured to determine whether to read a system information block (SIB) based on whether the RRC connection request is triggered as a result of redirection from a second RAT to the first RAT or is triggered as a result of a normal connection request to the first RAT.

In another aspect, a computer program product for wireless communications in a wireless network having a non-transitory computer-readable medium is disclosed. The computer readable medium has non-transitory program code recorded thereon which, when executed by the processor(s), causes the processor(s) to perform the operation of sending a radio resource control (RRC) connection request according to a first radio access technology (RAT). The program code also causes the processor(s) to determine whether to read a system information block (SIB) based on whether the RRC connection request is triggered as a result of redirection from a second RAT to the first RAT or as a result of a normal connection request to the first RAT.

Another aspect discloses an apparatus including means for sending a radio resource control (RRC) connection request according to a first radio access technology (RAT). The apparatus also includes means for determining whether to read a system information block (SIB) based on whether the RRC connection request is triggered as a result of redirection from a second RAT to the first RAT or as a result of a normal connection request to the first RAT.

This has outlined, rather broadly, the features and technical advantages of the present disclosure in order that the detailed description that follows may be better understood. Additional features and advantages of the disclosure will be described below. It should be appreciated by those skilled in the art that this disclosure may be readily utilized as a basis for modifying or designing other structures for carrying out the same purposes of the present disclosure. It should also be realized by those skilled in the art that such equivalent constructions do not depart from the teachings of the disclosure as set forth in the appended claims. The novel features, which are believed to be characteristic of the disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout.

DETAILED DESCRIPTION

Figure 1:
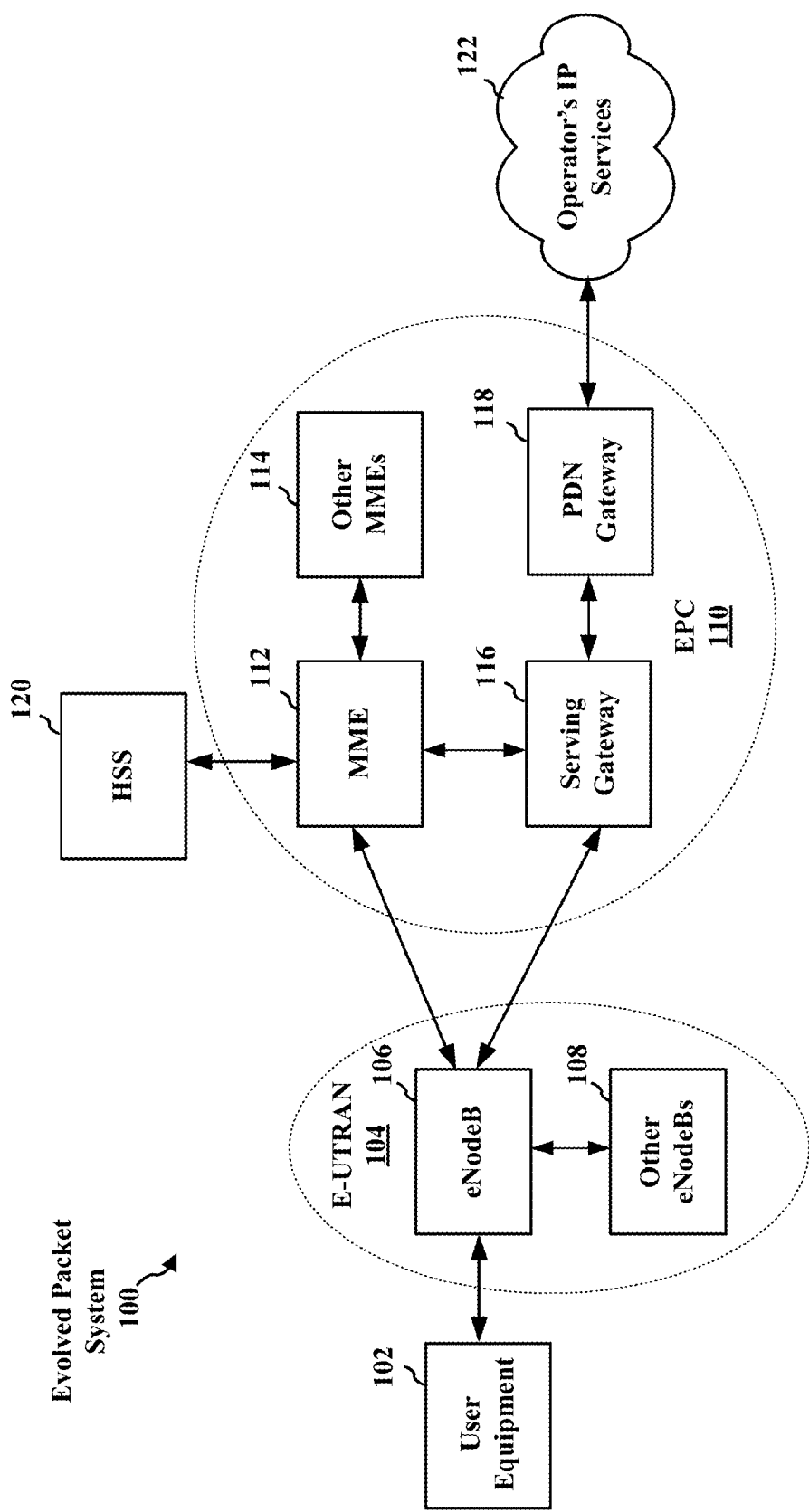
FIG. 1 is a diagram illustrating an example of a network architecture.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

Aspects of the telecommunication systems are presented with reference to various apparatus and methods. These apparatus and methods are described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more exemplary embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

FIG. 1 is a diagram illustrating an LTE network architecture 100. The LTE network architecture 100 may be referred to as an Evolved Packet System (EPS) 100. The EPS 100 may include one or more user equipment (UE) 102, an Evolved UMTS Terrestrial Radio Access Network (E-UTRAN) 104, an Evolved Packet Core (EPC) 110, a Home Subscriber Server (HSS) 120, and an Operator's IP Services 122. The EPS can interconnect with other access networks, but for simplicity those entities/interfaces are not shown. As shown, the EPS provides packet-switched services, however, as those skilled in the art will readily appreciate, the various concepts presented throughout this disclosure may be extended to networks providing circuit-switched services.

The E-UTRAN includes the evolved Node B (eNodeB) 106 and other eNodeBs 108. The eNodeB 106 provides user and control plane protocol terminations toward the UE 102. The eNodeB 106 may be connected to the other eNodeBs 108 via an X2 interface (e.g., backhaul). The eNodeB 106 may also be referred to as a base station, a base transceiver station, a radio base station, a radio transceiver, a transceiver function, a basic service set (BSS), an extended service set (ESS), or some other suitable terminology. The eNodeB 106 provides an access point to the EPC 110 for a UE 102. Examples of UEs 102 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, or any other similar functioning device. The UE 102 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

The eNodeB 106 is connected by an S1 interface to the EPC 110. The EPC 110 includes a Mobility Management Entity (MME) 112, other MMEs 114, a Serving Gateway 116, and a Packet Data Network (PDN) Gateway 118. The MME 112 is the control node that processes the signaling between the UE 102 and the EPC 110. Generally, the MME 112 provides bearer and connection management. All user IP packets are transferred through the Serving Gateway 116, which itself is connected to the PDN Gateway 118. The PDN Gateway 118 provides UE IP address allocation as well as other functions. The PDN Gateway 118 is connected to the Operator's IP Services 122. The Operator's IP Services 122 may include the Internet, the Intranet, an IP Multimedia Subsystem (IMS), and a PS Streaming Service (PSS).

Figure 2:
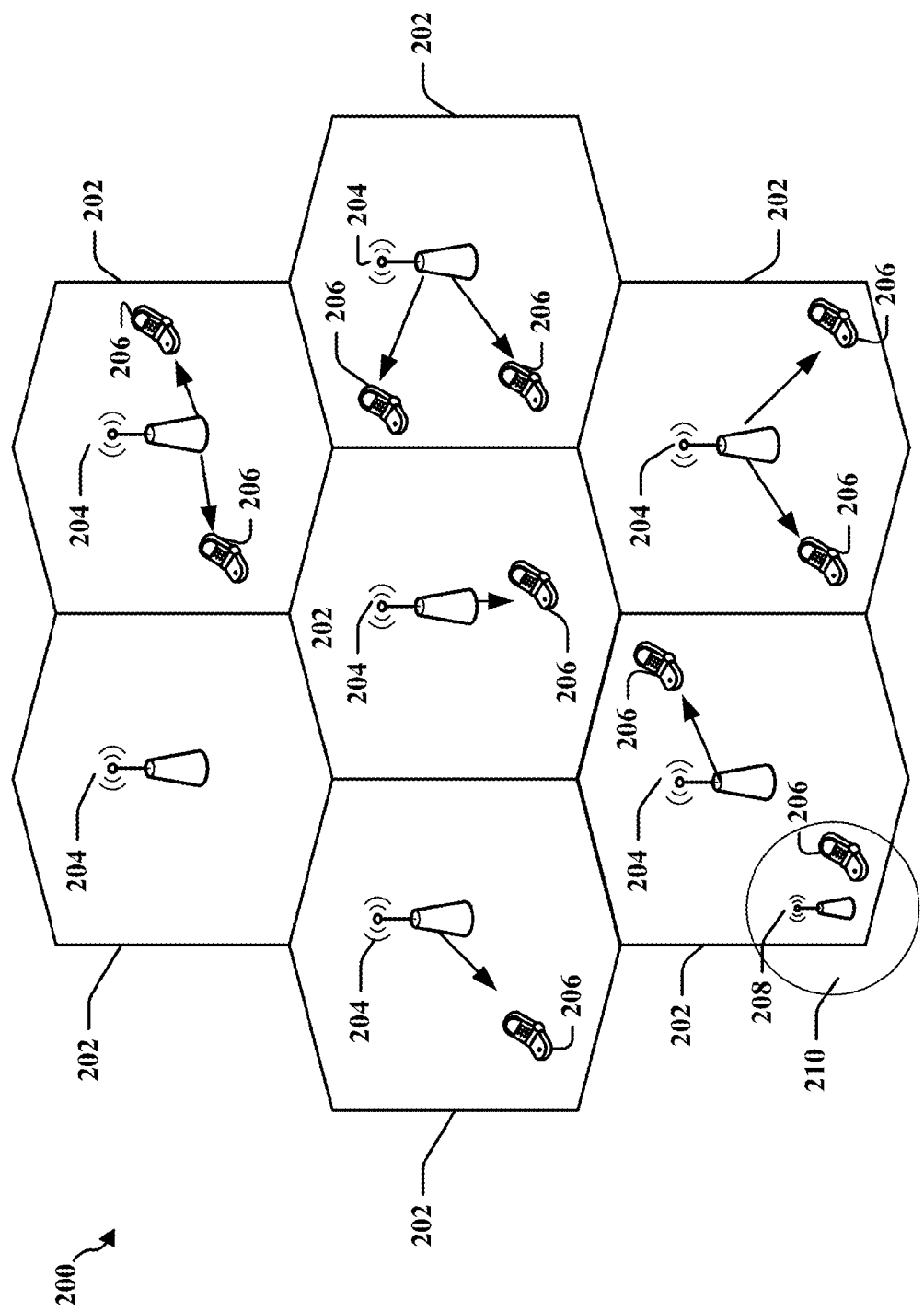
FIG. 2 is a diagram illustrating an example of an access network.

FIG. 2 is a diagram illustrating an example of an access network 200 in an LTE network architecture. In this example, the access network 200 is divided into a number of cellular regions (cells) 202. One or more lower power class eNodeBs 208 may have cellular regions 210 that overlap with one or more of the cells 202. A lower power class eNodeB 208 may be referred to as a remote radio head (RRH). The lower power class eNodeB 208 may be a femto cell (e.g., home eNodeB (HeNodeB)), pico cell, or micro cell. The macro eNodeBs 204 are each assigned to a respective cell 202 and are configured to provide an access point to the EPC 110 for all the UEs 206 in the cells 202. There is no centralized controller in this example of an access network 200, but a centralized controller may be used in alternative configurations. The eNodeBs 204 are responsible for all radio related functions including radio bearer control, admission control, mobility control, scheduling, security, and connectivity to the serving gateway 116.

The modulation and multiple access scheme employed by the access network 200 may vary depending on the particular telecommunications standard being deployed. In LTE applications, OFDM is used on the DL and SC-FDMA is used on the UL to support both frequency division duplexing (FDD) and time division duplexing (TDD). As those skilled in the art will readily appreciate from the detailed description to follow, the various concepts presented herein are well suited for LTE applications. However, these concepts may be readily extended to other telecommunication standards employing other modulation and multiple access techniques. By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), Ultra Mobile Broadband (UMB), IEEE 802.11 (Wi-Fi), IEEE 802.16 (WiMAX), IEEE 802.20, and Flash-OFDM employing OFDMA. UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The eNodeBs 204 may have multiple antennas supporting MIMO technology. The use of MIMO technology enables the eNodeBs 204 to exploit the spatial domain to support spatial multiplexing, beamforming, and transmit diversity. Spatial multiplexing may be used to transmit different streams of data simultaneously on the same frequency. The data steams may be transmitted to a single UE 206 to increase the data rate or to multiple UEs 206 to increase the overall system capacity. This is achieved by spatially precoding each data stream (i.e., applying a scaling of an amplitude and a phase) and then transmitting each spatially precoded stream through multiple transmit antennas on the DL. The spatially precoded data streams arrive at the UE(s) 206 with different spatial signatures, which enables each of the UE(s) 206 to recover the one or more data streams destined for that UE 206. On the UL, each UE 206 transmits a spatially precoded data stream, which enables the eNodeB 204 to identify the source of each spatially precoded data stream.

Spatial multiplexing is generally used when channel conditions are good. When channel conditions are less favorable, beamforming may be used to focus the transmission energy in one or more directions. This may be achieved by spatially precoding the data for transmission through multiple antennas. To achieve good coverage at the edges of the cell, a single stream beamforming transmission may be used in combination with transmit diversity.

In the detailed description that follows, various aspects of an access network will be described with reference to a MIMO system supporting OFDM on the DL. OFDM is a spread-spectrum technique that modulates data over a number of subcarriers within an OFDM symbol. The subcarriers are spaced apart at precise frequencies. The spacing provides "orthogonality" that enables a receiver to recover the data from the subcarriers. In the time domain, a guard interval (e.g., cyclic prefix) may be added to each OFDM symbol to combat inter-OFDM-symbol interference. The UL may use SC-FDMA in the form of a DFT-spread OFDM signal to compensate for high peak-to-average power ratio (PAPR).

Figure 3:
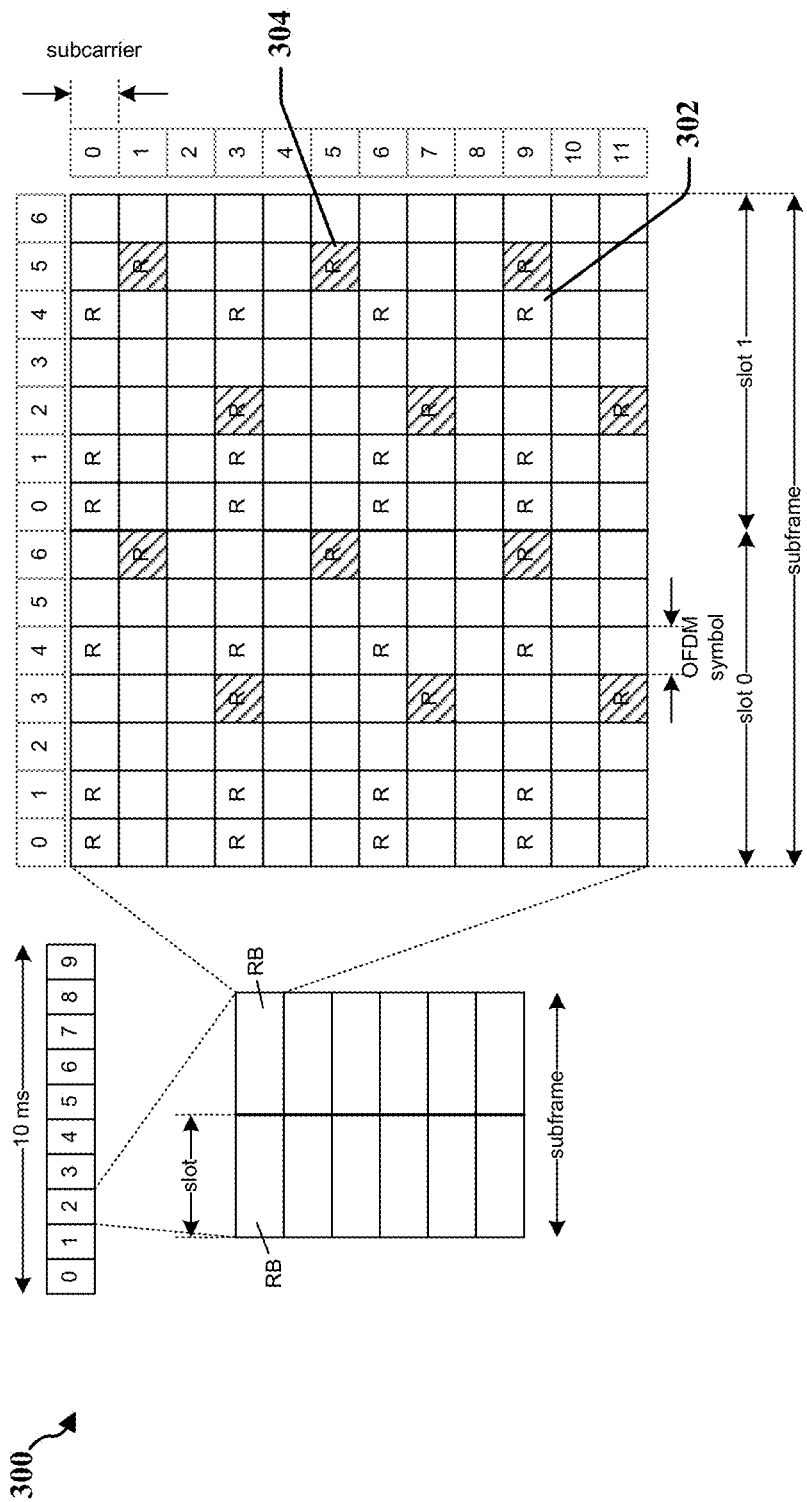
FIG. 3 is a diagram illustrating an example of a downlink frame structure in LTE.

FIG. 3 is a diagram 300 illustrating an example of a DL frame structure in LTE. A frame (10 ms) may be divided into 10 equally sized sub-frames. Each sub-frame may include two consecutive time slots. A resource grid may be used to represent two time slots, each time slot including a resource block. The resource grid is divided into multiple resource elements. In LTE, a resource block contains 12 consecutive subcarriers in the frequency domain and, for a normal cyclic prefix in each OFDM symbol, 7 consecutive OFDM symbols in the time domain, or 84 resource elements. For an extended cyclic prefix, a resource block contains 6 consecutive OFDM symbols in the time domain and has 72 resource elements. Some of the resource elements, as indicated as R 302, 304, include DL reference signals (DL-RS). The DL-RS include Cell-specific RS (CRS) (also sometimes called common RS) 302 and UE-specific RS (UE-RS) 304. UE-RS 304 are transmitted only on the resource blocks upon which the corresponding physical DL shared channel (PDSCH) is mapped. The number of bits carried by each resource element depends on the modulation scheme. Thus, the more resource blocks that a UE receives and the higher the modulation scheme, the higher the data rate for the UE.

Figure 4:
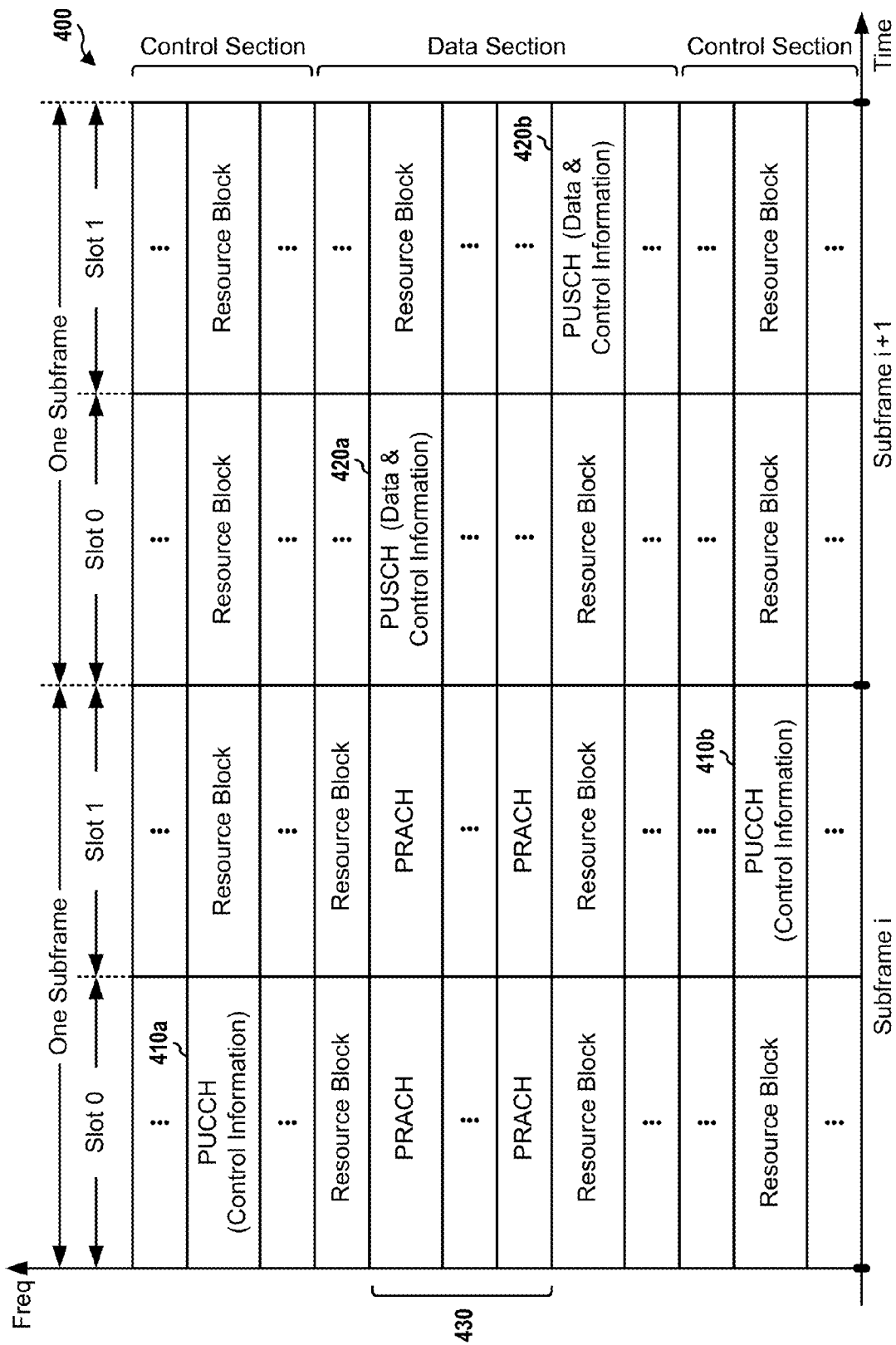
FIG. 4 is a diagram illustrating an example of an uplink frame structure in LTE.

FIG. 4 is a diagram 400 illustrating an example of an UL frame structure in LTE. The available resource blocks for the UL may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The UL frame structure results in the data section including contiguous subcarriers, which may allow a single UE to be assigned all of the contiguous subcarriers in the data section.

A UE may be assigned resource blocks 410a, 410b in the control section to transmit control information to an eNodeB. The UE may also be assigned resource blocks 420a, 420b in the data section to transmit data to the eNodeB. The UE may transmit control information in a physical UL control channel (PUCCH) on the assigned resource blocks in the control section. The UE may transmit only data or both data and control information in a physical UL shared channel (PUSCH) on the assigned resource blocks in the data section. A UL transmission may span both slots of a subframe and may hop across frequency.

A set of resource blocks may be used to perform initial system access and achieve UL synchronization in a physical random access channel (PRACH) 430. The PRACH 430 carries a random sequence and cannot carry any UL data/signaling. Each random access preamble occupies a bandwidth corresponding to six consecutive resource blocks. The starting frequency is specified by the network. That is, the transmission of the random access preamble is restricted to certain time and frequency resources. There is no frequency hopping for the PRACH. The PRACH attempt is carried in a single subframe (1 ms) or in a sequence of few contiguous subframes and a UE can make only a single PRACH attempt per frame (10 ms).

Figure 5:
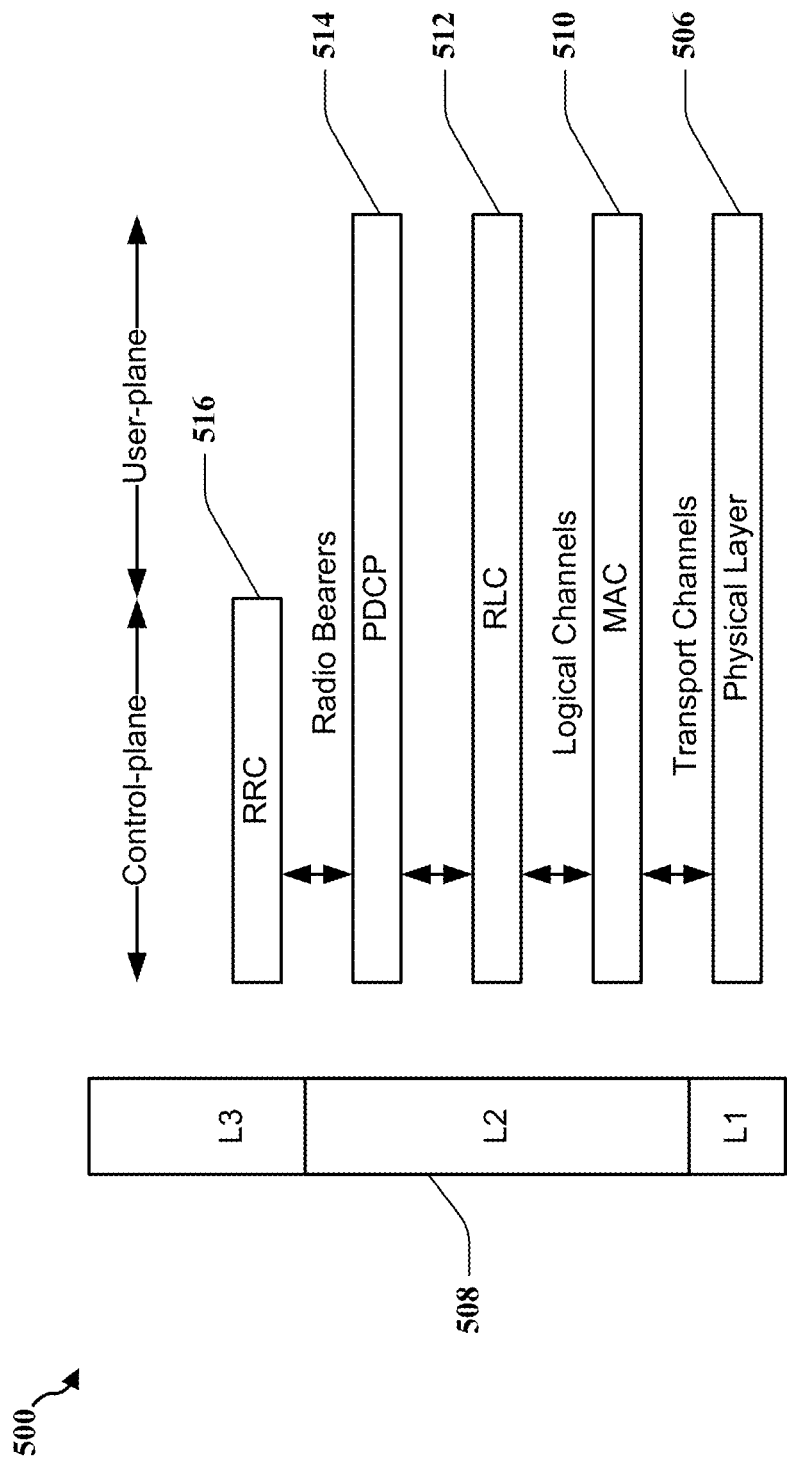
FIG. 5 is a diagram illustrating an example of a radio protocol architecture for the user and control plane.

FIG. 5 is a diagram 500 illustrating an example of a radio protocol architecture for the user and control planes in LTE. The radio protocol architecture for the UE and the eNodeB is shown with three layers: Layer 1, Layer 2, and Layer 3. Layer 1 (L1 layer) is the lowest layer and implements various physical layer signal processing functions. The L1 layer will be referred to herein as the physical layer 506. Layer 2 (L2 layer) 508 is above the physical layer 506 and is responsible for the link between the UE and eNodeB over the physical layer 506.

In the user plane, the L2 layer 508 includes a media access control (MAC) sublayer 510, a radio link control (RLC) sublayer 512, and a packet data convergence protocol (PDCP) 514 sublayer, which are terminated at the eNodeB on the network side. Although not shown, the UE may have several upper layers above the L2 layer 508 including a network layer (e.g., IP layer) that is terminated at the PDN gateway 118 on the network side, and an application layer that is terminated at the other end of the connection (e.g., far end UE, server, etc.).

The PDCP sublayer 514 provides multiplexing between different radio bearers and logical channels. The PDCP sublayer 514 also provides header compression for upper layer data packets to reduce radio transmission overhead, security by ciphering the data packets, and handover support for UEs between eNodeBs. The RLC sublayer 512 provides segmentation and reassembly of upper layer data packets, retransmission of lost data packets, and reordering of data packets to compensate for out-of-order reception due to hybrid automatic repeat request (HARQ). The MAC sublayer 510 provides multiplexing between logical and transport channels. The MAC sublayer 510 is also responsible for allocating the various radio resources (e.g., resource blocks) in one cell among the UEs. The MAC sublayer 510 is also responsible for HARQ operations.

In the control plane, the radio protocol architecture for the UE and eNodeB is substantially the same for the physical layer 506 and the L2 layer 508 with the exception that there is no header compression function for the control plane. The control plane also includes a radio resource control (RRC) sublayer 516 in Layer 3 (L3 layer). The RRC sublayer 516 is responsible for obtaining radio resources (i.e., radio bearers) and for configuring the lower layers using RRC signaling between the eNodeB and the UE.

Figure 6:
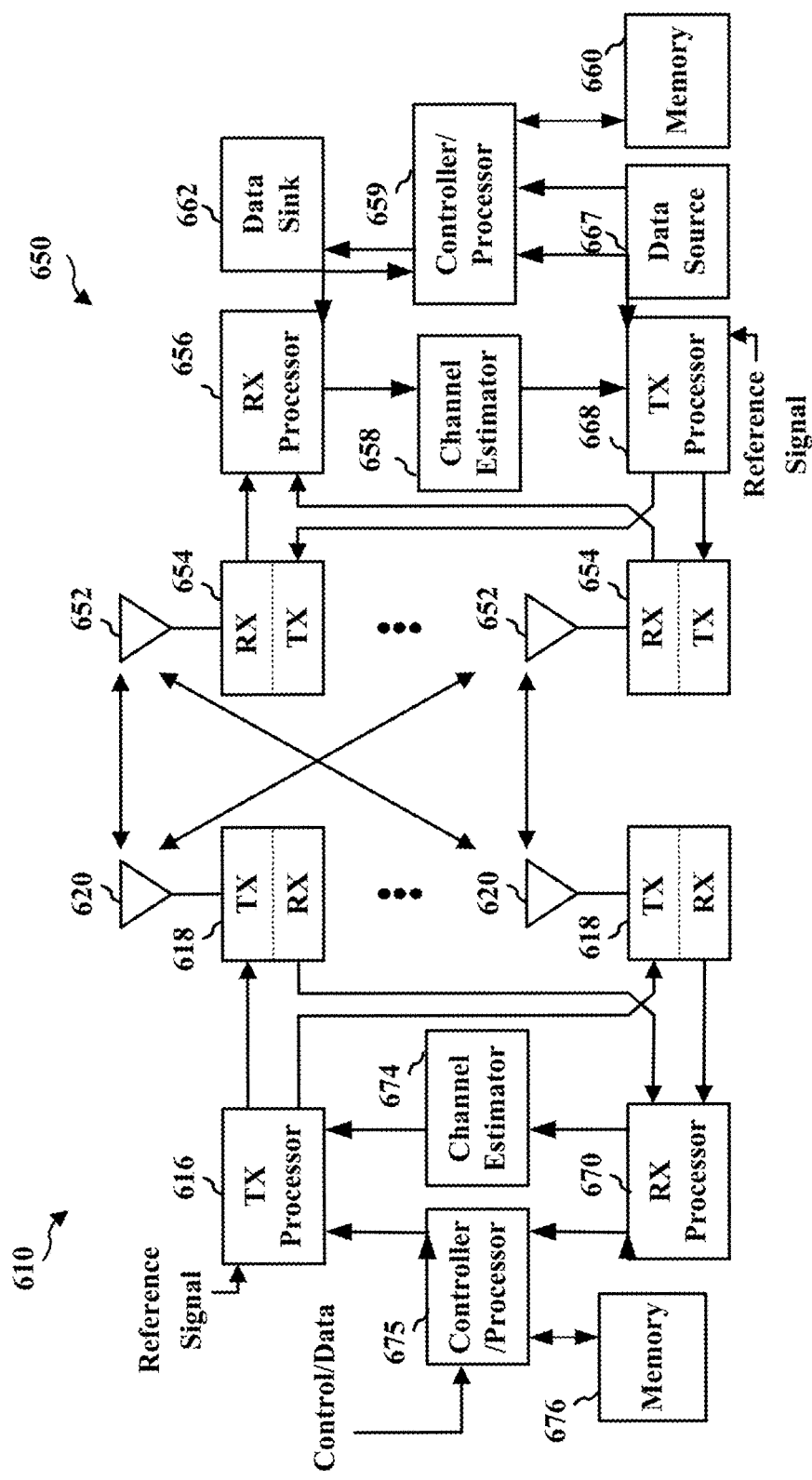
FIG. 6 is a diagram illustrating an example of an evolved Node B and user equipment in an access network.

FIG. 6 is a block diagram of an eNodeB 610 in communication with a UE 650 in an access network. In the DL, upper layer packets from the core network are provided to a controller/processor 675. The controller/processor 675 implements the functionality of the L2 layer. In the DL, the controller/processor 675 provides header compression, ciphering, packet segmentation and reordering, multiplexing between logical and transport channels, and radio resource allocations to the UE 650 based on various priority metrics. The controller/processor 675 is also responsible for HARQ operations, retransmission of lost packets, and signaling to the UE 650.

The TX processor 616 implements various signal processing functions for the L1 layer (i.e., physical layer). The signal processing functions includes coding and interleaving to facilitate forward error correction (FEC) at the UE 650 and mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 674 may be used to determine the coding and modulation scheme, as well as for spatial processing. The channel estimate may be derived from a reference signal and/or channel condition feedback transmitted by the UE 650. Each spatial stream is then provided to a different antenna 620 via a separate transmitter 618TX. Each transmitter 618TX modulates an RF carrier with a respective spatial stream for transmission.

At the UE 650, each receiver 654RX receives a signal through its respective antenna 652. Each receiver 654RX recovers information modulated onto an RF carrier and provides the information to the receiver (RX) processor 656. The RX processor 656 implements various signal processing functions of the L1 layer. The RX processor 656 performs spatial processing on the information to recover any spatial streams destined for the UE 650. If multiple spatial streams are destined for the UE 650, they may be combined by the RX processor 656 into a single OFDM symbol stream. The RX processor 656 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, is recovered and demodulated by determining the most likely signal constellation points transmitted by the eNodeB 610. These soft decisions may be based on channel estimates computed by the channel estimator 658. The soft decisions are then decoded and deinterleaved to recover the data and control signals that were originally transmitted by the eNodeB 610 on the physical channel. The data and control signals are then provided to the controller/processor 659.

The controller/processor 659 implements the L2 layer. The controller/processor can be associated with a memory 660 that stores program codes and data. The memory 660 may be referred to as a computer-readable medium. In the UL, the control/processor 659 provides demultiplexing between transport and logical channels, packet reassembly, deciphering, header decompression, control signal processing to recover upper layer packets from the core network. The upper layer packets are then provided to a data sink 662, which represents all the protocol layers above the L2 layer. Various control signals may also be provided to the data sink 662 for L3 processing. The controller/processor 659 is also responsible for error detection using an acknowledgement (ACK) and/or negative acknowledgement (NACK) protocol to support HARQ operations.

In the UL, a data source 667 is used to provide upper layer packets to the controller/processor 659. The data source 667 represents all protocol layers above the L2 layer. Similar to the functionality described in connection with the DL transmission by the eNodeB 610, the controller/processor 659 implements the L2 layer for the user plane and the control plane by providing header compression, ciphering, packet segmentation and reordering, and multiplexing between logical and transport channels based on radio resource allocations by the eNodeB 610. The controller/processor 659 is also responsible for HARQ operations, retransmission of lost packets, and signaling to the eNodeB 610.

Channel estimates derived by a channel estimator 658 from a reference signal or feedback transmitted by the eNodeB 610 may be used by the TX processor 668 to select the appropriate coding and modulation schemes, and to facilitate spatial processing. The spatial streams generated by the TX processor 668 are provided to different antenna 652 via separate transmitters 654TX. Each transmitter 654TX modulates an RF carrier with a respective spatial stream for transmission.

The UL transmission is processed at the eNodeB 610 in a manner similar to that described in connection with the receiver function at the UE 650. Each receiver 618RX receives a signal through its respective antenna 620. Each receiver 618RX recovers information modulated onto an RF carrier and provides the information to a RX processor 670. The RX processor 670 may implement the L1 layer.

The controller/processor 675 implements the L2 layer. The controller/processor 675 can be associated with a memory 676 that stores program codes and data. The memory 676 may be referred to as a computer-readable medium. In the UL, the controller/processor 675 provides demultiplexing between transport and logical channels, packet reassembly, deciphering, header decompression, control signal processing to recover upper layer packets from the UE 650. Upper layer packets from the controller/processor 675 may be provided to the core network. The controller/processor 675 is also responsible for error detection using an ACK and/or NACK protocol to support HARQ operations.

In one aspect of the present disclosure, the UMTS (universal mobile telecommunications system) deferred measurement control reading feature is enhanced to allow for selectively reading a system information broadcast (SIB) message, such as SIB message 19. In particular, the UE determines whether to read the SIB message or whether to skip reading the SIB message. Not reading a SIB message may enhance the speed for setup time, and may be useful for circuit switched fall back (CSFB) of voice calls triggered while on the EUTRAN (evolved UMTS terrestrial radio access network). However, not reading a SIB message may cause failed redirections or other problems under certain circumstances. Thus, it may be advantageous to selectively read a SIB message.

The SIB message 19 provides a UE, such as UEs 206 and 650, with information about EUTRAN neighbor frequencies in a surrounding area and their reselection priorities. Currently, when the UE reads SIB message 19, the UE will store the EUTRAN frequencies of the SIB message 19 in a local variable, such as EUTRA_FREQUENCY_INFO_LIST. The UE checks whether there is an overlap between these frequencies and the EUTRAN frequencies supported by the UE. If there is an overlap, the UE sends an overlap indication to the network the next time the UE requests a radio resource control (RRC) connection so the network knows it can redirect the UE back to the EUTRAN. If there is no overlap, the UE does not send the overlap indication and the network knows the UE does not support any of the EUTRAN frequencies available in the area. Accordingly, if the network receives no overlap indication from the UE, the network may keep the UE on the UTRAN.

When the UE does not read the SIB message 19, the local variable EUTRA_FREQUENCY_INFO_LIST is empty (i.e., no EUTRAN frequencies stored in the local variable). Currently, if the local variable is empty, the UE sets the overlap indicator upon the next RRC connection request. If there is not any overlap between the available EUTRAN frequencies and the UE supported EUTRAN frequencies, and the overlap indicator is still set, a redirection of the UE to EUTRAN will fail and lead to dropped calls.

There are at least two scenarios where an RRC connection request occurs. In the first scenario (also called the redirection scenario), the UE is redirected from one radio access technology (RAT) to another RAT, e.g., from EUTRAN (i.e., LTE) to UTRAN. The redirected UE sends a connection request to a base station according to the other RAT (e.g., UTRAN) to establish a connection. While the examples of UTRAN and EUTRAN are used herein, it will be appreciated that systems and methods described herein are not limited to the specific RATs described.

In the second scenario (also called normal connection request scenario), the UE is camped on a RAT, such as UTRAN, and sends a "normal" connection request for connection to the UTRAN.

The UE is aware of its state, i.e., whether it is the first scenario or the second scenario. The UE maintains a flag indicating whether the UE is in re-direction, i.e., whether a redirection request has arrived from the network.

In one aspect of the present disclosure, a UE (e.g., UE 206, UE 650), selectively reads a SIB based on a determination of which scenario is applicable to the UE. In one particular example, the UE sends a connection request to a base station according to a radio access technology (e.g., UTRAN). The UE determines which scenario, redirection or normal, applies. As mentioned above, the determination may be made based on the setting of the redirection flag described above. If the flag is set, the redirection scenario applies. If the flag is not set, the normal scenario applies. Based, at least in part, on the applicable scenario, the UE determines whether or not to read the SIB. For example, if the connection request occurred in conjunction with redirection (i.e., the redirected UE requesting connection on UTRAN) the UE skips reading the SIB. Skipping reading the SIB is safe because an overlap indicator may not be included with the connection request. The redirected scenario includes circuit switched fall back (CSFB) scenarios. In particular, for CSFB calls the SIB message is not read allowing for a quicker call setup time.

If the UE determines the RRC connection requested occurs as a result of a normal RRC connection request (i.e., the UE is camped on the UTRAN and requests connection), the UE reads the SIB message. By reading the SIB message in the case of the normal RRC connection request, the variable, EUTRA_FREQUENCY_INFO_LIST, will be correct and failed redirections due to mismatch in the supported and available EUTRAN frequencies are avoided. While the example above specifically refers to SIB 19 and its contents, it will be appreciated that SIBs 11, 12, or others may be selectively read or skipped in a similar manner.

In one aspect of the present disclosure, a UE sends a radio resource control (RRC) connection request to a base station according to a first radio access technology (RAT). In one example, the first RAT is UTRAN. The request may be sent by the UE transmitter 654TX. The UE determines whether to read a SIB, such as SIB 19, based, at least in part on whether the connection request was made in conjunction with a redirection of the UE from a second RAT to the first RAT or whether the connection request is a normal connection request to the first RAT. This determination may be made, for example by the controller/processor 659. The determination may be made by determining the value of the redirection flag stored at the UE as described above.

Figure 7:
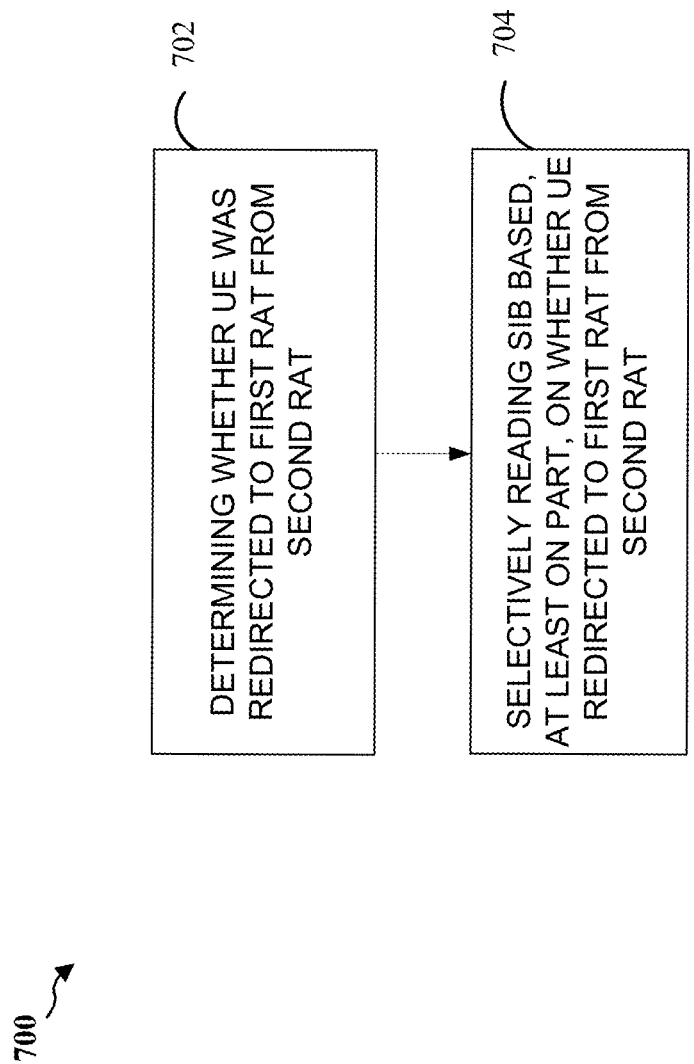
FIG. 7 is a flow chart of a method of wireless communication.

FIG. 7 illustrates a method 700 for reading system information block messages. The method may be performed by a UE such as UE 206, 650. At block 702, the UE determines whether it was redirected to a first radio access technology (RAT) from a second RAT. The determination may be made, for example, by the controller/processor 659. In one example, the first RAT is UTRAN. At block 704, the UE selectively reads a system information block (SIB), such as SIB 19, based, at least in part on whether the UE was redirected to the first RAT from the second RAT.

In one configuration, the UE 650 is configured for wireless communication including means for determining. In one aspect, the determining means may be the controller/processor 659 and/or memory 660 configured to perform the functions recited by the determining means. The UE 650 is also configured to include means for selectively reading. In one aspect, the selectively reading means may be the controller/processor 659, memory 660; transmit processor 668, transmitters 654 and/or antenna 652 configured to perform the functions recited by the selectively reading means. In another aspect, the aforementioned means may be any module or any apparatus configured to perform the functions recited by the aforementioned means.

Figure 8:
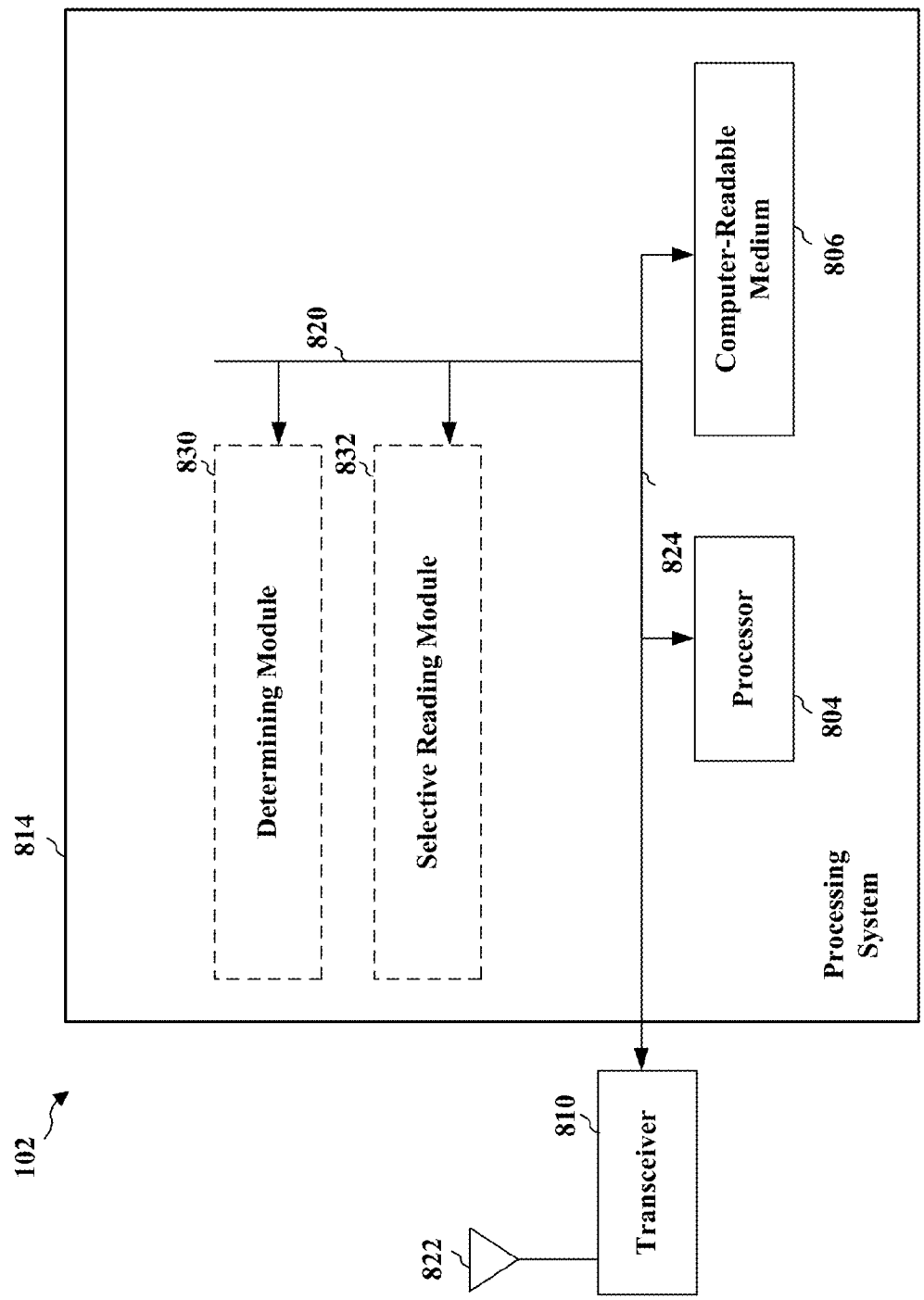
FIG. 8 is a diagram illustrating an example of a hardware implementation for an apparatus employing a processing system.

FIG. 8 is a diagram illustrating an example of a hardware implementation for an apparatus 102 employing a processing system 814. The processing system 814 may be implemented with a bus architecture, represented generally by the bus 820. The bus 820 may include any number of interconnecting buses and bridges depending on the specific application of the processing system 814 and the overall design constraints. The bus 820 links together various circuits including one or more processors and/or hardware modules, represented by the processor 804, the modules 830, 832 and the computer-readable medium 806. The bus 820 may also link various other circuits such as timing sources, peripherals, voltage regulators, and power management circuits, which are well known in the art, and therefore, will not be described any further.

The apparatus includes a processing system 814 coupled to a transceiver 810. The transceiver 810 is coupled to one or more antennas 822. The transceiver 810 provides a means for communicating with various other apparatus over a transmission medium. The processing system 814 includes a processor 804 coupled to a computer-readable medium 806. The processor 804 is responsible for general processing, including the execution of software stored on the computer-readable medium 806. The software, when executed by the processor 804, causes the processing system 814 to perform the various functions described above for any particular apparatus. The computer-readable medium 806 may also be used for storing data that is manipulated by the processor 804 when executing software.

The processing system further includes determining module 830 and selective reading module 832. The modules may be software modules running in the processor 804, resident/stored in the computer readable medium 806, one or more hardware modules coupled to the processor 804, or some combination thereof. The processing system 814 may be a component of the UE 650 and may include the memory 660 and/or at least one of the TX processor 668, the RX processor 656, and the controller/processor 659.

In one configuration, the apparatus 102 for wireless communication includes means for determining, and means for selecting. The aforementioned means may be one or more of the aforementioned modules of the apparatus 100 and/or the processing system 814 of the apparatus 102 configured to perform the functions recited by the aforementioned means. As described above, the processing system 814 may include the RX Processor 656, TX Processor 668, the transceivers 654, antenna 652, memory 660 and/or the controller/processor 659. As such, in one configuration, the aforementioned means may be the antenna 652, receiver 654, RX Processor 656, the controller/processor 659, and/or the memory 660 configured to perform the functions recited by the aforementioned means.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method of wireless communication, comprising:
   determining whether a user equipment (UE), in a deferred measurement control reading (DMCR) state, is establishing a connection with a first radio access technology (RAT) based at least in part on a redirection from a second RAT; and
   selectively reading, at the UE, a system information block (SIB) broadcast from the first RAT based at least in part on whether the UE was redirected to the first RAT from the second RAT, the UE skipping reading the SIB when the UE was redirected to the first RAT from the second RAT, and the UE reading the SIB when the connection with the first RAT is not from the redirection.

2. The method of claim 1, in which the UE has been redirected to the first RAT for a circuit switched fall back (CSFB) call.

3. The method of claim 1, in which the first RAT comprises UTRAN and the second RAT comprises EUTRAN.

4. The method of claim 1, in which the SIB comprises SIB 19.

5. An apparatus for wireless communication, comprising:
   a memory; and
   at least one processor coupled to the memory, the at least one processor being configured:
     to determine whether a user equipment (UE), in a deferred measurement control reading (DMCR) state, is establishing a connection with a first radio access technology (RAT) based at least in part on a redirection from a second RAT; and
     to selectively read, at the UE, a system information block (SIB) broadcast from the first RAT based at least in part on whether the UE was redirected to the first RAT from the second RAT, the UE skipping reading the SIB when the UE was redirected to the first RAT from the second RAT, and the UE reading the SIB when the connection with the first RAT is not from the redirection.

6. The apparatus of claim 5, in which the UE was redirected to the first RAT for a circuit switched fall back (CSFB) call.

7. The apparatus of claim 5, in which the first RAT comprises UTRAN and the second RAT comprises EUTRAN.

8. The apparatus of claim 5, in which the SIB comprises SIB 19.

9. A non-transitory computer-readable medium having program code recorded thereon, the program code configured to:
   determine whether a user equipment (UE), in a deferred measurement control reading (DMCR) state, is establishing a connection with a first radio access technology (RAT) based at least in part on a redirection from a second RAT; and
   selectively read, at the UE, a system information block (SIB) broadcast from the first RAT based at least in part on whether the UE was redirected to the first RAT from the second RAT, the UE skipping reading the SIB when the UE was redirected to the first RAT from the second RAT, and the UE reading the SIB when the connection with the first RAT is not from the redirection.

10. The non-transitory computer-readable medium of claim 9, in which the first RAT comprises UTRAN and the second RAT comprises EUTRAN.

11. An apparatus for wireless communication, comprising:
    means for determining whether a user equipment (UE), in a deferred measurement control reading (DMCR) state, is establishing a connection with a first radio access technology (RAT) based at least in part on a redirection from a second RAT; and
    means for selectively reading, at the UE, a system information block (SIB) broadcast from the first RAT based at least in part on whether the UE was redirected to the first RAT from the second RAT, the UE skipping reading the SIB when the UE was redirected to the first RAT from the second RAT, and the UE reading the SIB when the connection with the first RAT is not from the redirection.

12. The apparatus of claim 11, in which the first RAT comprises UTRAN and the second RAT comprises EUTRAN.

* * * * *